(12) United States Patent
Song

(10) Patent No.: US 6,301,260 B1
(45) Date of Patent: *Oct. 9, 2001

(54) DEVICE AND METHOD FOR MULTIPLEXING CELLS OF ASYNCHRONOUS TRANSMISSION MODE

(75) Inventor: Doug-Young Song, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/399,190

(22) Filed: Sep. 20, 1999

Related U.S. Application Data

(63) Continuation of application No. 08/774,178, filed on Dec. 26, 1996, now Pat. No. 5,982,777.

(30) Foreign Application Priority Data

Dec. 26, 1995 (KR) .................................... 95-56582

(51) Int. Cl.⁷ .................................... H04L 12/56
(52) U.S. Cl. .................................... 370/415; 370/537
(58) Field of Search .................... 370/412, 415, 370/416, 418, 468, 537

(56) References Cited

U.S. PATENT DOCUMENTS

| | | |
|---|---|---|
| 4,769,810 | 9/1988 | Eckberg, Jr. et al. . |
| 4,833,671 | 5/1989 | Beckner et al. . |
| 4,896,316 | 1/1990 | Lespagnol et al. . |
| 5,007,048 | 4/1991 | Kowalk . |
| 5,048,013 | 9/1991 | Eng et al. . |
| 5,062,106 | 10/1991 | Yamazaki et al. . |
| 5,140,588 | 8/1992 | Danner . |
| 5,142,653 | 8/1992 | Schefts . |
| 5,210,744 | 5/1993 | Yamanaka et al. . |
| 5,228,032 | 7/1993 | Mertelmeier et al. . |
| 5,233,606 | 8/1993 | Pashan et al. . |
| 5,297,140 | 3/1994 | Boyer et al. . |
| 5,299,191 | 3/1994 | Boyer et al. . |
| 5,335,222 | 8/1994 | Kamoi et al. . |
| 5,369,635 | 11/1994 | Gandini et al. . |
| 5,394,396 | 2/1995 | Yoshimura et al. . |
| 5,410,540 | 4/1995 | Aiki et al. . |
| 5,446,726 | 8/1995 | Rostoker et al. . |
| 5,455,820 | 10/1995 | Yamada . |
| 5,499,238 | 3/1996 | Shon . |
| 5,517,495 | 5/1996 | Lund et al. . |
| 5,539,747 | 7/1996 | Ito et al. . |
| 5,541,926 | 7/1996 | Saito et al. . |
| 5,563,885 | 10/1996 | Witchey . |
| 5,570,348 | 10/1996 | Holden . |
| 5,982,777 | * 11/1999 | Song .................................... 370/415 |

\* cited by examiner

*Primary Examiner*—Chau Nguyen
*Assistant Examiner*—Jasper Kwoh
(74) *Attorney, Agent, or Firm*—Robert E. Bushnell, Esq.

(57) ABSTRACT

The device and method for multiplexing cells inputted to an asynchronous transmission mode using an input buffer according to the amount of traffic. The cell multiplexing device of an asynchronous transmission mode, includes: a buffer portion which include cell buffers corresponding to input ports, for storing cells received through the input ports; counters which have the number corresponding to that of the buffers, for storing the number of cells to be stored in the buffers a unit clock unit for determining for the counters a count unit of cells to be stored in the buffers; selector for outputting control signals to select buffers having their maximum values by comparing the values of the counters with each other; and a unit for inputting the output of the buffer unit and multiplexing the input cells according to the control signal, wherein the generation of buffer overflow is prevented by primarily processing the cells from a buffer where the most cells are stored.

10 Claims, 3 Drawing Sheets

DEVICE AND METHOD FOR MULTIPLEXING CELLS OF ASYNCHRONOUS TRANSMISSION MODE

CROSS-REFERENCE TO RELATED APPLICATION

This application is a continuation application of U.S. application Ser. No. 08/774,178, filed in the U.S. Patent & Trademark Office on the 26th day of December 1996 and issued as U.S. Pat. No. 5,982,777 on Nov. 9, 1999, U.S. application Ser. No. 08/774,178 being incorporated herein by reference. Also, this application makes reference to, incorporates the same hereins and claims priority and all benefits accruing under 35 U.S.C. §120 from the aforementioned U.S. application Ser. No. 08/774,178, and issued as U.S. Pat. No. 5,982,777, entitled Device and Method for Multiplexing Cells of Asynchronous Transmission Mode.

CLAIM OF PRIORITY

This application makes reference to, incorporates the same herein, and claims all benefits accruing under 35 U.S.C §119 from an application entitled Device and Method for Multiplexing Cells of Achronous Transmission Mode earlier filed in the Korean Industrial Property Office on the 26th of December 1995, and there duly assigned Ser. No. 56582/1995 by that Office.

BACKGROUND OF THE INVENTION

1. Field of the Invention

The present invention relates to multiplexing devices and processes generally, and more particularly, to a device and process for multiplexing cells by dynamically controlling a buffer.

2. Description of the Related Art

In general, a multiplexing device sequentially selects and transmits input data. A Round Robin multiplexing system is configured to sequentially transmit the data (cell) received in buffers that are provided at each input port. Typically, a multiplexing device sequentially reads the data received to each of the buffers. The Round Robin system reads and transmits the data (cell) stored in a corresponding buffer while making an orderly selection of each of the buffers. I have found however, with multiplexers using a Round-Robin system, that the cell can be lost due to buffer overflow or that buffer delay can occur when traffic concentrates on a particular buffer.

The traffic concentration at a particular buffer during multiplexing as above occurs as follows. First concentration of traffic can occur when the traffic originates due to burstiness of the source. Second, during the internal for the routing process in the network, the concentration of traffic occurs when a plurality of incoming traffic is received for the same point of destination. Third, the traffic concentrates when the burstiness increases in the traffic due to jitter occurring due to diverse delays inside the net. Accordingly, in multiplexing devices using the Round Robin system, when the input traffic is not uniform and the burstiness becomes strong, the number of the cells being received at a particular cell will correspondingly increase. Thus, cell loss can occur due to buffer overflow if attributable to the concentration of the traffic; also, cell transmission delay can occur inside the buffer. I have observed that since the use efficiency of the buffer deteriorates substantially in the event that the number of the cells received by a particular buffer is substantially reduced, multiplexing devices using the Round Robin system are not effective when the traffic is not uniform and when the destination of the traffic tends to be concentrated.

Earlier efforts in asynchronous transmission mode cell switching, such as the Supervision Control System of Yoshimura et al., U.S. Pat. No. 5,394,396, and the Arrangement For Controlling Shared-buffer-memory Overflow In A Multi-priority Environment of Pashan, et al., U.S. Pat. No. 5,233,606, depended upon circuits that not infrequently discarded cells. Other efforts such as the Method And A System Of Control Of Asynchronous Time Communication Outputs of Boyer, et al., U.S. Pat. No. 5,299,191, depended upon continuous comparisons of buffer occupancy in time division multiplexing.

Designs such as the Output-Buffer Switch For Aschronous Transfer Mode of Kenji Yamada, U.S. Pat. No. 5,455,820, endeavored to avoid loss of cells by operating a buffer controller on the basis of a determination of occupancy ratio relative to a predetermined threshold. These designs however, seem to require an excessive number of buffers, and incur concomitant delay in transmission of the multiplexed cells.

More recent efforts in the art, such as the Asynchronous Transfer Mode (ATM) Multiplexing Process Device And Method Of The Broadband Integrated Service Digital Network Subscriber Access Apparatus, by Seung W. Shon, U.S. Pat. No. 5,499,238, for example have sought to use a complex ranking of cells using determinations of whether a buffer is full and the class order of each of the cells. Efforts to address the problems attendant to non-uniform traffic and undue concentration can not be reliably addressed however, on a classification scheme that depends in part upon the occurrence of full buffers.

SUMMARY OF THE INVENTION

It is therefore, one object of the present invention to provide an improved multiplexing circuit and process.

It is another object to provide a multiplexing circuit and process able to accommodate non-uniformly distributed traffic to the input ports of the circuit.

It is still another object to provide a multiplexing circuit and process able to accommodate excessive concentration of traffic to the same point of destination.

It is yet another object to provide a device and process for multiplexing cells received in an asynchronous transmission mode using an input buffer, in dependence upon the amount of traffic.

It is still yet another object to provide a simple and reliable asynchronous transfer mode multiplexer and process.

Accordingly, to achieve these and other objects, there is provided a cell multiplexing device of an asynchronous transmission mode constructed with a buffer stage including cell buffers corresponding to different input ports, for storing cells received through the input ports. Counters corresponding in number to the buffers, store the numbers of cells to be stored in the buffers; a unit clock unit determines a count unit of cells to be stored in the counters; and a selector generates control signals for selecting those buffers holding their maximum capacity of value by comparing the values of the counters with each other. A multiplexer unit receives the output of the buffer unit and multiplexes the input cells in accordance with the control signal. Generation of buffer overflow is prevented by primarily processing the cells read from the buffer where the most cells are stored.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate same or similar components, wherein.

DETAILED DESCRIPTION OF THE PREFERRED EMBODIMENT

Figure 1:
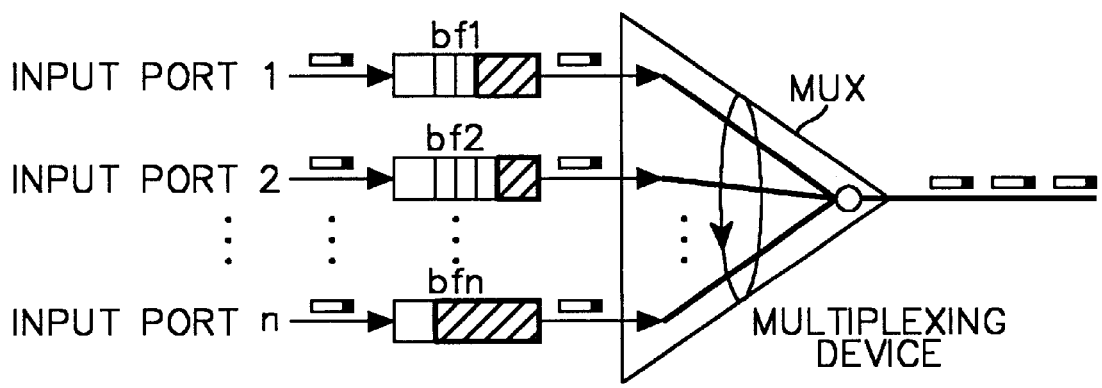
FIG 1 is an abstract diagram illustrating the configuration of a hypothetical representation of contemporary multiplexing practice in the art using a Round Robin system.

Turning now to the attached drawings, FIG. 1 shows the configuration of a prior art multiplexing device using a Round Robin system. Multiplexing device 50 sequentially multiplexes the data received at input ports 1, 2 . . . n, and buffers bf1 to bfn store the data cells received at each input port. With the configuration shown, multiplexing device 50 performs multiplexing by sequentially reading the data cells stored in each buffer bf1-bfn. By using a Round Robin system, multiplexing device 50 reads and transmits the data cell stored in a corresponding buffer while sequentially selecting each of buffers bf1 to bfn. When multiplexing device 50 uses such a RoundRobin system, and traffic concentrates on a particular buffer, the cell may be lost due to buffer overflow or, alternatively, buffer delay can happen, as is represented by FIG. 2.

Figure 2:
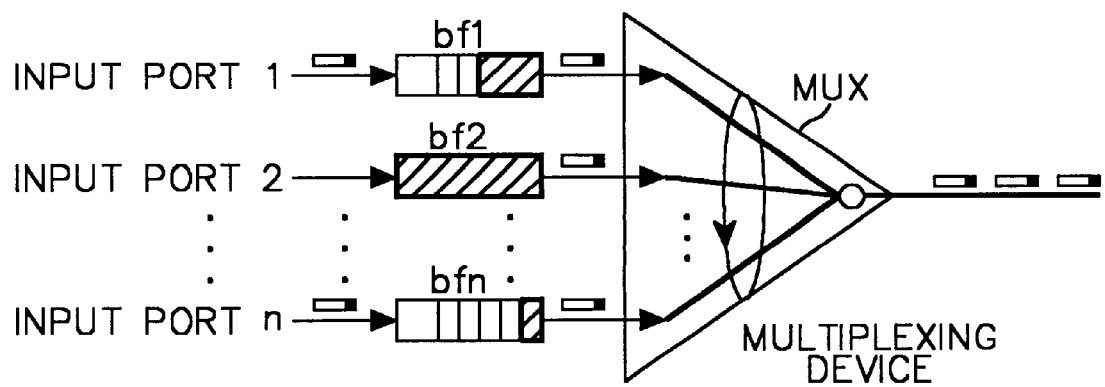
FIG. 2 is a diagram illustrating the occurrence of buffer overflow in the multiplexing device illustrated by FIG. 1.

FIG. 2 is a diagram illustrating the occurrence of buffer overflow in multiplexing device 50. The traffic concentration on a particular buffer during multiplexing can vary, with adverse affects upon reliability, as follows. First, when the traffic itself occurs due to burstiness, that is, excessive bursts of data from the source, the traffic becomes unduly concentrated. Second, during the internal routing process of the network, the concentration of traffic occurs when a plurality of traffic is received that is destined for the same point. Third, traffic becomes unduly concentrated when burstiness increases due to jitter occurring from diverse delays inside the net. Consequently, with multiplexing device 50 using the Round Robin system as above, when the input traffic is not uniform and the burstiness becomes strong, the number of the cells being received at a particular port will be correspondingly increased. Thus, cell loss can occur due to the buffer overflow by concentration of the traffic, and also, cell transmission delay can occur inside the buffer. Since the use efficiency of the buffer is greatly reduced in the event that the number of the cells to be stored in a particular buffer is reduced, multiplexing device 50 is not especially effective when the traffic is either not uniform and or the destination of the traffic is unduly concentrated.

Services to be provided through a network of an asynchronous transmission mode has the widespreading range of traffic speed as well as various traffic features. However, since the resource of the network has a limit, a method for managing the network to simultaneously provide all the services without deterioration of quality is necessarily required. The present invention provides a method of performing efficiently using a multiplexing device by controlling a cell buffer according to a traffic amount which is preset in a multiplexing device for multiplexing cell traffic. Thus, the present invention can further improve service quality factors such as cell damage or cell transmission delay capable of occurring when a designated buffer having a fixed size is used for every cell input port, and has an effect of sharing a buffer by all ports in terms of efficiency in using the buffer.

Figure 3:
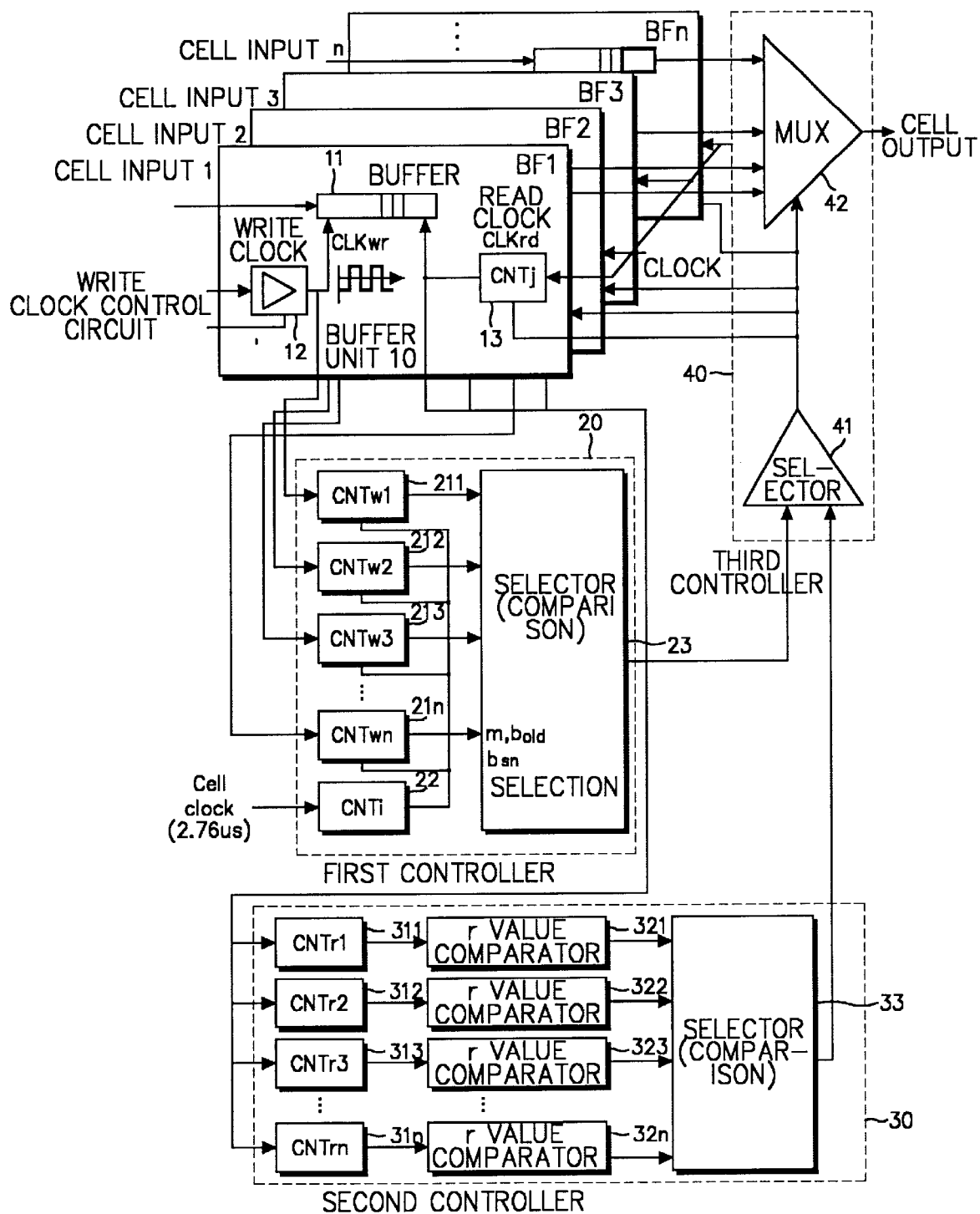
FIG. 3 is a diagram illustrating the configuration of a device for multiplexing cells in an asynchronous mode according to the principles of the present invention.

FIG. 3 is a diagram illustrating the configuration of a device for multiplexing cells of an asynchronous transfer mode (i.e.,.ATM) according to the principles of the present invention. The multiplexing device is constituted with a buffer unit 10, a first controller 20, a second controller 30 and at third controller 40. First, buffer unit 10 can be constructed with a plurality of discrete buffers 1-n, namely BF1 to BFn. The buffers BF1 to BFn are for storing and reading cells to be inputted namely, CELL INPUTS 1-n, and each buffer BF is also comprised of a cell buffer 11, a tri-state buffer 12 for controlling and generating a write A clock CLKwr and a counter 13 for controlling and generating a read clock CLKrd. The buffers BF1 to BFn are connected to the input port to which each input port of the buffer BF1 to BFn corresponds by one-to-one correspondence and an output port of the buffer BF1 to BFn is connected to a multiplexer 42 of the third controller 40.

The cell buffer 11 stores a cell received being connected to the input port. The tri-state buffer 12 provides the write clock CLKwr to thereby store the cell inputted to the cell buffer 11 when a write control clock is inputted, and performs a function of controlling the write clock to be supplied when a valid cell is inputted. The counter 13 outputs the read clock CLKrd to read the cell stored in the cell buffer 11. The read clock is controlled by the counter 13 on the purpose of supplying the read clock CLKrd as much as the number of the cell to be read sequentially at a time from the selected cell buffer 11.

The first controller 20 counts the number of the cells stored in each buffer BF1 to BFn and has a function of searching a buffer which stores the greatest number of cells by comparing the counted cell values with each other. The first controller 20 is comprised of counters CLKw1 to CLKwn, 211 to 21n for counting the CLKwr where cells are actually stored in each buffer BF1 to BFn, a selector 23 for searching the maximum value by comparing the count values with each other and a unit clock counter CNTi 22 for setting the unit of the counter. The unit clock counter 22 also determines how many cells will be counted as a unit when the cells to be stored in the buffer unit 10 are counted. In the selector 23, the maximum value is selected by comparing the values of counters 211 to 21n with each other, and if there are plural maximum values, the one that has not been selected for a longer time is to be selected.

The second controller 30 performs a function of selecting a buffer having the count value of a the number of selecting each buffer BF1 to BFn which corresponds to an allowance r which is not selected at its maximum in the buffers BF1 to BFn. The second controller 30 is comprised of counters CNTr1 to CNTrm for counting the read clock CLKrd1 to CLKrdn used upon really reading the cell from each buffer BF1 to BFn, r-value comparators 321 to 32$n$ for comparing the counter values outputted from each counter 311 to 31$n$ to reach the allowance value r with each other, and a selector 33 for sequentially selecting one from the values which reach the allowance r upon there exist a plurality of values reading the allowance r.

The third controller 40 selects one among the buffers selected in the first and second controllers 20 and 30, and controls to read the cell from the selected buffer. The third controller 40 is comprised of a selector 41 for receiving the outputs of the first and second controllers 20 and 30, and selecting one having a priority, and a multiplexer 42 for outputting the cell output of the buffer corresponding to the buffers BF1 to BFn according to the output of the selector 41.

Thus, in the multiplexing device configured as shown in FIG. 3, the buffer unit 10 stores the cells received via the input port in each corresponding buffer. The first controller 20 selects the buffer where the most cells are stored by counting the write clock CLKwr supplied to each buffer BF1 to BFn, and the second controller 30 selects the buffer having an allowance r which is not most selected by counting the read clock CLKrd supplied to each buffer BF1 to BFn. Thus, the third controller 40 multiplexes and outputs the cell stored in the buffer having a priority by the buffer unit 10 according to the selection signal outputted from the first and second controllers 20 and 30.

The operation of the multiplexing device according to the present invention will be described 4a referring to FIG. 3. When a plurality of traffic inputs are to be multiplexed in a place where the traffic characteristic of service to be provided as depicted in an asynchronous transmission mode network, the above buffers BF1 to BFn should be managed efficiently, i.e., economically. For this purpose, the multiplexing device according to the present invention counts the number of cells stored in each buffer BF1 to BFn and compares the counted results with each other to read out the cell from the buffer where the most number of the cells are stored. Thus, the overflow can be prevented for being generated in a particular buffer or the efficiency in using the buffer can be prevented from being generated. The reason of counting the number of the cells in each buffer is to read out the cell from a buffer which is most probable of generating the buffer overflow by recognizing a fact that which buffer has most cells.

In the buffer control method according to the present invention, the number of cells stored in each buffer is counted and compared to read out a cell by selecting a buffer having the greatest value using the following control algorithm.

First, when the number of the cells stored in the buffers BF1 to BFn is counted, a basic unit i is to be selected as a cell period of c units (c=1, 2, 3, . . . ) so that the output control speed of the cell can be dynamically adjusted according to the change of the traffic amount. In the present invention, the cell period T1 is assumed as 2.76 us.

Second, the buffer having the greatest value is selected by comparing the number of cells stored in the buffers BF1 to BFn with each other and detecting the greatest value m. The number of the stored cells with respect to each buffer BF1 to BFn are indicated by reference numerals b1, b2, b3, . . . , bn, respectively.

Third, when the buffer storing the greatest number of the cells is selected among the buffers BF1 to BFn, the number of the cells to be read out from the corresponding buffer is selected as j units 0=1, 2, 3, . . . ) to dynamically adjust the cell storing state in a buffer according to the change of the traffic amount. That is, the cells are read out as many as the increased value j from the buffer having the most probability of overflow occurrence by increasing the j value thereto, and otherwise, less cells are to be read out from the buffer by decreasing the j value.

Fourt, when j<c, the number of cells to be read out from the buffer is within the range of C since the comparison is performed by the "i" unit which is the cell period of c units. Here, an idle cell is removed from a physical layer so that the cell input from the physical layer to an ATM layer becomes 2.76 us or less.

Fifth, in case when there is the same cell count comparison value of the buffers ($b_x=b_y$, where x and y are arbitrary integers), a buffer $b_{old}$ which has not been selected for a longest time is selected. To perform such control, the numbers ($b_{sn}=1, 2, 3, \ldots$) of selection to each buffer are counted and the counted value should be comparable. When $b_{s1}=b_{s2}=b_{s3}=\ldots=b_{sn}$, the sequence of selection is $b_{s1}$, $b_{s2}$, $b_{s3}$, . . . $b_{sn}$.

Sixth, upon $b_{old}=r$, the corresponding buffer can be primarily selected. Here, 'r' is set by consideration of the characteristic of service quality such as jitter or transmission delay.

Seventh and the last, when m<j, the number of the cell to be read out from the corresponding buffer is set as the value "m."

Figure 4:
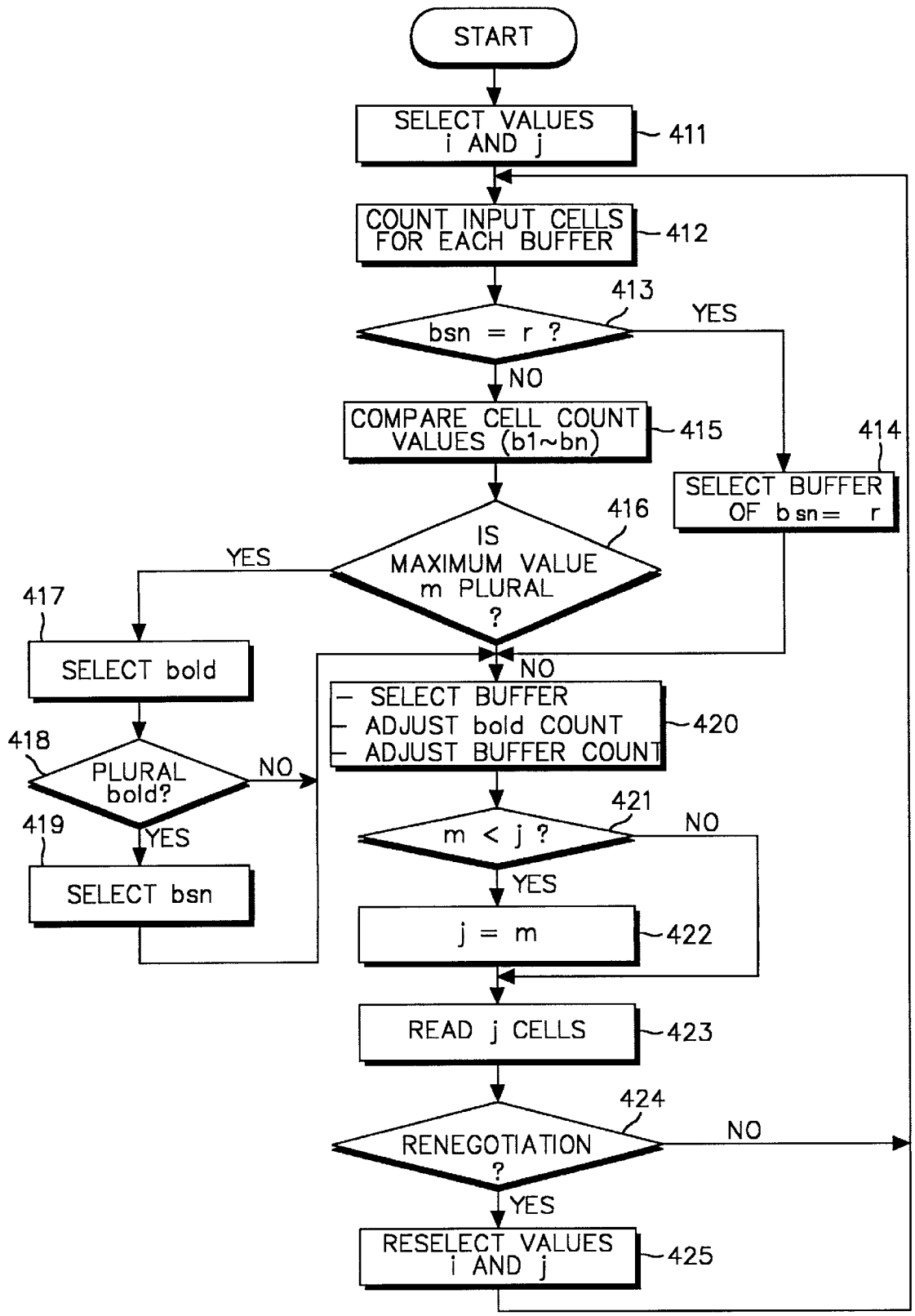
FIG. 4 is a flowchart for explaining a method for multiplexing cells in an asynchronous mode according to the principles of the present invention.

FIG. 4 is a flowchart for explaining a method for multiplexing cells of an asynchronous mode according to the present invention. In FIG. 4, $b_n$ (wherein n=1, 2, 3. . . ) is denoted as a buffer number; $b_{old}$ is denoted as a buffer which has not been selected for the longest time; and $b_{sn}$ (n=1, 2, 3, . . . ) is denoted as the selection number of each buffer. Also, "i" is denoted as the number of cells to be read at a time from the selected buffer; "m" is denoted as the number of cells of a buffer where the greatest number of cells are stored; and 'r' is denoted as the number of the cell time of the unselected buffer.

Referring to FIG. 4, in step 411, values i and j are set. Herein, i is selected by cell periods of c units (where c=1, 2, 3, . . . ) as a count unit of cells inputted to a buffer and j signifies the number of cells to be successively read out at a time from the selected buffer. Next, in step 412, the cells inputted to each input buffer are counted. Here, the cell count method is i and the value i is @ proportional to cell unit c multiplied by an integer (wherein i=1c, 2c, 3c, . . . and 11 C" is cell). That is, when i =5c, every 5 cells is counted as one upon being inputted. There is difference in the application of the traffic characteristic by selecting an appropriate i value during setting call considering the traffic amount of each service.

In step 413, it is checked whether $b_{sn}$ indicating the number of selection of each buffer is the same as "r" which is a time number that the buffer is not selected, and if so, the buffer that $b_{sn}=r$ is selected at step 414 to proceed to step 420. However, if not in step 413, steps 416 and 417 are proceeded, in order that the maximum value (m) can be searched by comparing the values (b1, b2, b31 . . . bn) of counting cells stored in each buffer with each other at step 415. Here, when the maximum value m is determined to be plural in step 416, the buffer bold which has not been selected for the longest time is selected in step 417. After that, steps 418 and 419 are proceeded thereafter, and buffers are selected in an order of $b_{s1}$, $b_{s2}$, $b_{s3}$, . . . , $b_{sn}$ in the case of setting plural buffers bold (in $b_{sx}$, x is an arbitrary integer among 1 through n).

When the maximum value m is not plural in step 416, or after a buffer is selected by proceeding step 414 or 419, the buffer count value changed in step 420 and the value $b_{old}$ are adjusted. In step 421, "m" which is represented as the cell numbers stored in the buffer where the most cells are stored, is compared with "j" which is the cell number of the cells to be read out at a time from the buffer are compared. At this time, if m<j, i.e., the number of cells stored in the selected buffer is less than that of the cells to be read out, j is changed into m in step 422 and cells are read out from the selected buffer in step 423. Here, the cell number of the cells to be read out is the integer-multiplication of j and the j can be selected (0=1, 2, 3, . . . ), namely, when j=5, cells are read out by 5 units. When m>j, step 423 is proceeded. The value j can be set as a different value depending on the buffers. Since the burstiness of traffic is different from each other, in case of the traffic of great burstiness, the value j is increased to thereby read out cells from a buffer as many as that, and on the contrary, in case of traffic of lower-burstiness, the value j is decreased so that a lesser number of cells is to be read out from the buffer.

When a service quality parameter is reconsidered during the proceeding of call, the renegotiation is detected in step 424 and the values i and j are updated in step 425. The values i and j are selected when the call is set and can be changed during the call procession. Since the standardization is made such that the renegotiation to traffic parameter can be available when the call is proceeded, the traffic characteristic can be changed during the call procession.

As described above, the multiplexing device according to the present invention efficiently multiplexes the cell traffic by controlling the cell buffer according to the traffic amount. Thus, the multiplexing device according to the present invention can improve a service quality factor such as cell damage or cell transmission delay occurring when a designated buffer having a fixed size is used for each cell input port, as well as provide advantages as all ports share the buffer in terms of the efficiency in using the buffer.

The present invention can be applied to a terminal equipment (hereinafter, referred to as TE), a transmission equipment including a Network Termination½ (NT-½), a concentrator and a multiplexer, and an exchange system, ie., all equipment relating to a communication network.

Also, the present invention can be designed using a buffer (memory), a counter logic, a selector and other passive devices. These devices are commercialized components and fast enough to operate at a unit of 2.7 us so that purchase and circuit design can be facilitated.

Therefore, it should be understood that the present invention is not limited to the particular embodiments disclosed herein as the best mode contemplated for carrying out the present invention, but rather that the present invention is not limited to the specific embodiments described in this specification except as defined in the appended claims.

What is claimed is:

1. A cell multiplexing device of an asynchronous transmission mode, comprising:
    a buffer unit which includes a plurality of cell buffers corresponding to input ports, for storing cells received through said input ports;
    a plurality of counters, each of said plural of counters respectively corresponding to a corresponding cell buffer, each if said plurality of counters respectively storing a number corresponding to cells stored in each of said cell buffers;
    a unit clock unit determining for each of said plurality of counters a count unit of cells stored in said plurality of cell buffers;
    a selector outputting control signals to select cell buffers in an order of selection of maximum values by comparing values of said plurality of counters for corresponding cell buffers; and
    a unit receiving said control signals, said unit receiving an output of said buffer unit and multiplexing cells from said buffer unit according to said control signals, said unit processing cells respectively stored in said cell buffers to be output from said buffer unit according to said order of selection of maximum values where most cells are stored.

2. A method for multiplexing cells of an asynchronous transmission mode, comprising the steps of:
    storing cells received from input ports in a plurality of cell buffers of a buffer unit;
    counting a number of cells inputted to each of said plurality of cell buffers by a plurality of counters each respectively corresponding to one of said plurality of cell buffers;
    storing respectively in each of said plurality of counters a number corresponding to cells stored in each of said plurality of cell buffers;
    determining for each of said plurality of counters a count unit of cells stored in said plurality of cell buffers;
    determining an order of selection of maximum values by comparing cell count values of each of said plurality of cell buffers;
    selecting a cell buffer having a maximum value according to said order of selection of maximum values;
    receiving an output of said buffer unit and multiplexing and outputting cells stored in said selected cell buffer from said buffer unit according to said order of selection of maximum values; and
    processing cells respectively stored in said plurality of cell buffers to output from said buffer unit cells of each said selected cell buffer according to said order of selection of maximum values where most cells are stored.

3. The method as claimed in claim 2, further comprised of said selecting step selects from said plurality of cell buffers according to said order of selection of maximum values, and cells stored in said plurality of cell buffers are multiplexed and output according to said order of selection of maximum values.

4. The method as claimed in claim 3, further comprised of said selecting step selects from said plurality of cell buffers a cell buffer that has not been selected for a longer time from among cell buffers each corresponding to a same said maximum value.

5. The method as claimed in claim 2, further comprised of said selecting step selects from said plurality of cell buffers a cell buffer that has not been selected for a longer time from among cell buffers each corresponding to a same said maximum value.

6. The cell multiplexing device as claimed in claim 1, further comprised of one of said plurality of cell buffers that has not been selected for a longer time from among cell buffers each corresponding to a same maximum value is selected for said processing.

7. A cell multiplexing device of an asynchronous transmission mode, comprising:
    a buffer unit which includes a plurality of cell buffers corresponding to input ports, for storing cells received through said input ports;
    a plurality of counters, each of said plurality of counters respectively corresponding to a corresponding cell buffer,
    a selector outputting control signals to select cell buffers in an order of selection determined by comparing read count values and write count values of said plurality of counters for corresponding cell buffers; and a unit receiving said control signals, said unit receiving an output of said buffer unit and multiplexing cells from said buffer unit according to said control signals, said unit processing cells respectively stored in said cell buffers to be output from said buffer unit according to said order of selection.

8. The cell multiplexing device as claimed in claim 7, further comprised of one of said plurality of cell buffers that has not been selected for a longer time from among cell buffers each corresponding to a same value in said order of selection is selected for said processing.

9. A method for multiplexing cells of an asynchronous transmission mode, comprising the steps of:

storing cells received from input ports in a plurality of cell buffers of a buffer unit;

counting a number of cells input to each of said plurality of cell buffers and output from each of said plurality of cell buffers by a plurality of counters;

storing write count values each respectively corresponding to cells stored in each of said plurality of cell buffers;

storing read count values each respectively corresponding to cells output from each of said plurality of cell buffers;

determining an order of selection of cell buffers by comparing said read count values and said write count values for each of said plurality of cell buffers;

selecting a cell buffer of said plurality of cell buffers according to said order of selection;

receiving an output of said buffer unit and multiplexing and outputting cells stored in said selected cell buffer from said buffer unit according to said order of selection; and processing cells respectively stored in said plurality of cell buffers to output from said buffer unit cells of each said selected cell buffer according to said order of selection.

10. The method as claimed in claim 9, further comprised of said selecting step selects from said plurality of cell buffers a cell buffer that has not been selected for a longer time from among cell buffers each corresponding to a same value in said order of selection.

\* \* \* \* \*